United States Patent

[11] 3,578,919

[72] Inventor John F. O'Neill
Eatontown, N.J.
[21] Appl. No. 787,876
[22] Filed Dec. 30, 1968
[45] Patented May 18, 1971
[73] Assignee Bell Telephone Laboratories, Incorporated
Murray Hill, N.J.

[54] TIME COMPRESSION TONE DETECTOR
15 Claims, 6 Drawing Figs.

[52] U.S. Cl. ........ 179/84, 340/171
[51] Int. Cl. ........ H04m 1/50, H04q 5/10
[50] Field of Search ........ 179/84 (UF), 15 (Inquired); 340/171

[56] References Cited
UNITED STATES PATENTS

| | | | |
|---|---|---|---|
| 3,217,106 | 11/1955 | Muroga et al. | 179/15ATI |
| 3,274,341 | 9/1966 | Allen | 179/15.55 |
| 3,445,606 | 5/1969 | Brightman | 179/84UF |

*Primary Examiner*—Kathleen H. Claffy
*Assistant Examiner*—William A. Helvestine
*Attorneys*—R. J. Guenther and Kenneth B. Hamlin

ABSTRACT: In a frequency detection device time compression techniques are utilized for detecting the presence of a predetermined tone on any one of a plurality of communication channels. Signals appearing on the plurality of channels are sequentially sampled and stored in digital form. Information relating to individual channels is read out of storage and sent to the frequency detection device at a rate greater than the rate at which the individual channels are sampled.

INVENTOR
J. F. O'NEILL
BY
ATTORNEY

Patented May 18, 1971 3,578,919

5 Sheets-Sheet 3

TIME COMPRESSION TONE DETECTOR

BACKGROUND OF THE INVENTION

1. Field of the Invention

This invention relates to tone detectors and, more specifically, to tone detectors which detect the presence or absence of single or multiple frequencies on one or more of a plurality of communication channels, 2. Description of the Prior Art Arrangements for detecting the presence of a single frequency or multifrequency tone on a plurality of input communication channels have wide applicability, particularly in the telephone art. Known tone detector arrangements generally include frequency-responsive devices, such as "tuned tanks" or lumped L-C networks, which are associated with the individual communication channels. Such individual frequency-responsive devices are bulky and expensive, and the required one-to-one correspondence between the communication channels and the frequency-responsive devices results in an arrangement which is difficult to miniaturize. Also, when the signals to be detected are of low frequency, applicable lumped L-C networks become excessively large and expensive. Suitable thin film active networks for this purpose are unavailable at the present time.

SUMMARY OF THE INVENTION

Accordingly, it is an object of this invention to provide a new and improved tone detector arrangement for detecting the presence of a particular signal on one or more of a plurality of communication channels.

It is another object of this invention to provide a simple, compact and inexpensive tone detector arrangement for detecting the presence of a single frequency or a multifrequency signal on one or more of a plurality of communication channels.

It is another object of this invention to provide a multichannel tone detector arrangement which can readily be miniaturized or constructed using integrated circuit techniques.

It is yet another object of this invention to provide a small, compact and inexpensive multichannel tone detector arrangement for detecting low frequency signals.

These and other objects of the invention are accomplished in an arrangement employing time compression techniques for detecting a tone of predetermined frequency on any one of a plurality of input communication channels using a single detector.

Signals appearing on the individual input communication channels are sampled sequentially, encoded, and stored in storage medium, illustratively a serial shift register. The shift register is tapped at equally spaced intervals in such manner that the multiplexed samples from a single input communication channel appear at each of the taps simultaneously. Successively stored samples, which correspond to any one of the communication channels, are read out of the shift register in parallel via the taps and stored momentarily in a buffer register. The samples are provided serially by the buffer register to a tone detector at a rate substantially greater than the rate at which the channels are sampled. The detector, which is shared among several channels, thus reads samples faster than any single channel can generate them. The tone detector provides an output in response to a tone which, as directed out of the buffer register, corresponds to predetermined multiple of the frequency at one of the input communication channels.

A single digit binary code provides sufficient information for detection of a single frequency tone signal on any one of the channels. However, for detection of multifrequency signals, binary codes having two or more digits are required to accurately reconstruct the signals samples. Thus, analog-digital encoders and decoders, respectively, are necessary to convert the analog input signals on the communication channels into digitally encoded form for storage and to convert the digital signal back into analog form for transmission to the tone detector.

In another illustrative embodiment of the invention particularly adapted to multifrequency tone detection, the encoded signal samples from the plurality of communication channels are stored in respective individual shift registers, the contents of which are gated, in sequence, to a single detector for tone detection.

BRIEF DESCRIPTION OF THE DRAWING

A complete understanding of the present invention may be gained from a consideration of the following detailed description and the accompanying drawing, in which.

DETAILED DESCRIPTION

Single Frequency Tone Detector

Figure 1:
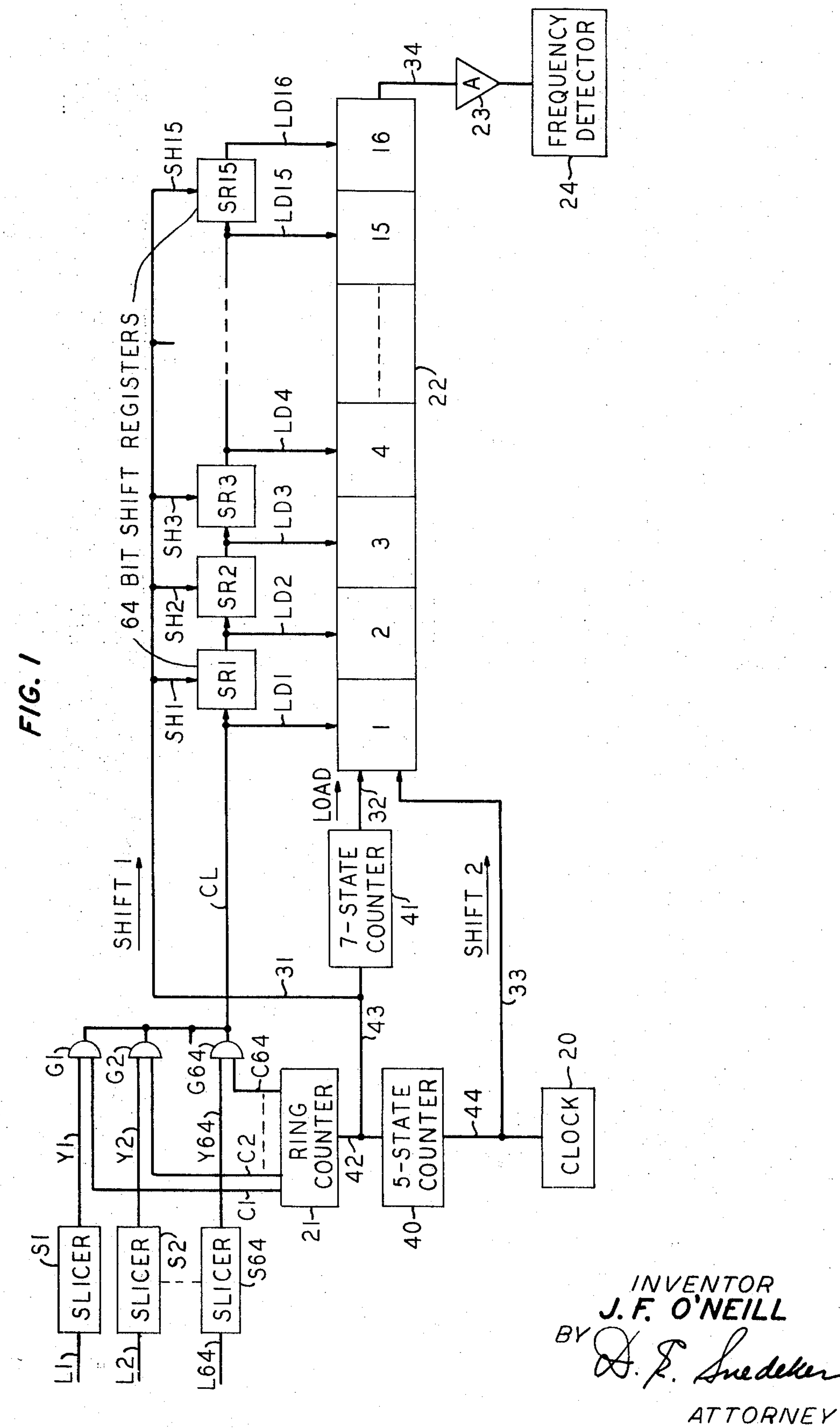
FIG. 1 is a block diagram of an illustrative embodiment of a single frequency tone detector in accordance with the principles of the invention.

A tone detector for sensing a single predetermined frequency on any one of 64 input communication channels is depicted in FIG. 1. The communication channels on which the frequency appears are designated L1 through L64, of which only channels L1, L2, and L64 are shown in FIG. 1. Channels L1 through L64 are connected to associated ones of slicer circuits S1 through S64 which deliver a 1-bit digital output on leads Y1 through Y64, respectively. The output of one of slicer circuits S1 through S64 represents a binary 0 when the instantaneous value of the input signal on the associated one of channels L1 through L64 is below a predetermined threshold voltage value, and the output represents a binary 1 when the value of the input signal is above the predetermined threshold value. For example, it will be assumed herein that if the value of the signal on channel L1 is below the predetermined threshold value, illustratively 0 volts, slicer S1 provides a zero output on lead Y1; if the value of the signal on channel L1 is above the predetermined threshold value, slicer S1 provides a binary 1 output on lead Y1.

Leads Y1 through Y64 are connected to the inputs of AND gates G1 through G64, respectively. The respective outputs of gates G1 through G64 are multipled to lead CL, which is connected to the input of shift register SR1. Thus, when one of gates G1 through G64 is enabled, the binary output provided by the corresponding one of slicers S1 through S64 is transmitted over lead CL and is registered in the first storage location or stage of shift register SR1. Shift register SR1, as well as each of shift registers SR2 through SR15, comprises a plurality of stages equal to the number of communication channels, illustratively, 64, or equal to a multiple of this number.

Timing signals for the operation of the tone detector of FIG. 1 are provided by clock 20, which delivers periodic clock pulses on lead 33. Lead 33 is connected to lead 44, and lead 44 to the input of five-state counter 40, which delivers an output pulse on lead 42 for every fifth clock pulse received on lead 44. Lead 42 connects counter 40 to 64-state ring counter 21, which is responsive to successive pulses on lead 42 from counter 40. Ring counter 21 provides output pulses in sequence on each of leads C1 through C64 40 to successive pulses on lead 42 from counter 40. Leads C1 through C64 are connected to enable inputs of respective ones of AND gates G1 through G64. Accordingly, for every fifth clock pulse provided by clock 20 on lead 44, a successive one of gates G1 through G64 is enabled thereby gating the digital output of a corresponding one of slicers S1 through S64 over lead CL for registering in shift register SR1. EAch of channels L1 through L64 is sampled in this manner at a rate such that successive bits from a particular channel form an approximation of an input signal of the frequency to be detected.

The output of counter 40 is also connected via leads 42, 43, and 31 to shift leads SH1 through SH15, which are connected to shift terminals of respective shift registers SR1 through SR15. (Only shift registers SR1, SR2, SR3, and SR15 are shown in FIG. 1.) A pulse appearing on shift leads SH1 through SH15 operates shift bits stored in each of respective shift registers SR1 through SR15 one stage to the right in FIG. 1. Shift registers SR1 through SR15 are connected in tandem, the last stage of each of shift registers SR1 through SR14 being connected to the first stage of the succeeding shift register. Accordingly, as successive pulses appear on lead 31 and are directed over leads SH1 through SH15, bits appearing lead CL are shifted through successive stages of register SR1, register SR2, register SR3, and so forth, through register SR15.

Lead CL which is connected to the input of shift register SR1, and each of the leads interconnecting successive ones of shift registers SR1 through SR15 are connected to respective ones of transfer leads LD1 through LD16. Transfer leads LD1 through LD16, in turn, are connected in parallel to respective storage locations or stages 1 through 16 of 16-bit buffer storage shift register 22. (Only stages 1 through 4, 15, and 16 are shown if FIG. 1) The serial output of shift register 22 from stage 16 is connected via lead 34 through amplifier 23 to frequency detector 24, which may comprise, for example, a tuned reactive circuit for detecting a signal of predetermined frequency.

The output of 5-state counter 40 is connected via leads 42 and 43 to 7-state counter 41, which delivers an output pulse on lead 32 for every seventh pulse delivered by 5-state counted 40. Lead 32 is connected to the parallel load terminal of shift register 22. Thus each pulse on lead 32 from counter 41 causes bits appearing on transfer leads LD1 through LD16 ro be registered simultaneously in respective stages 1 through 16 of shift register 22.

The output of clock 20 is connected over lead 33 to the shift terminal of shift register 22. Each clock pulse from clock 20 on lead 33 operates to shift bits stored in shift register 22 one bit location to the right. Information bits shifted out of stage 16 of register 22 are delivered, via line 34 and amplifier 23, to frequency detector 24.

Figure 2:
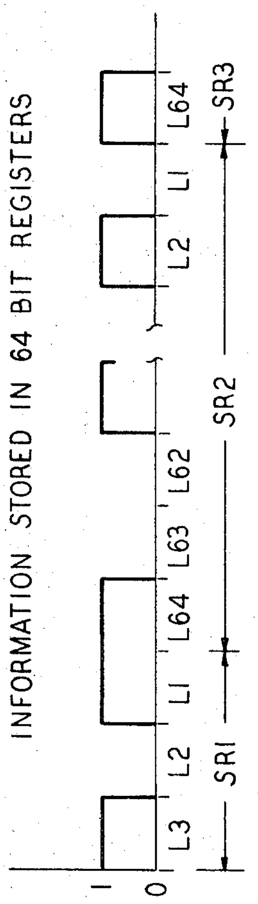
FIG. 2 is a diagram of a typical pattern of stored information bits useful in describing the operation of the embodiment of FIG. 1.
Figure 3:
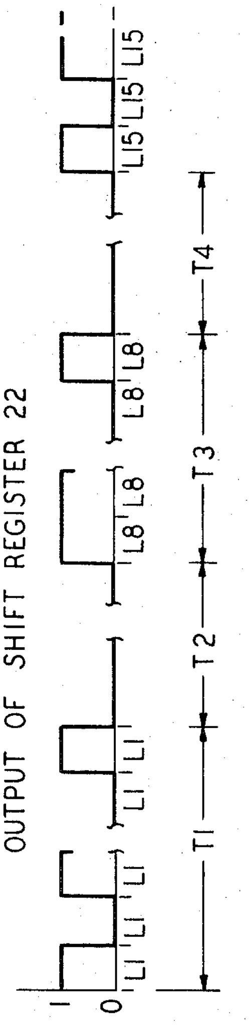
FIG. 3 is a diagram of a typical pattern of output pulses useful in describing the operation of the embodiment of FIG. 1.

With the above description in mind, consider now the operation of the embodiment of FIG. 1 with reference to FIGS. 2 and 3. As leads C1 through C64 are pulsed by counter 21 in the manner described above, gates G1 through G64 are successively enabled, thereby permitting the binary output of slicers S1 through S64 to be sampled and registered in shift register SR1. For example, when lead C1 is pulsed, gate G1 is enabled, and the output of slicer S1 is extended over lead CL for registering in the first stage of shift register SR1. On the next pulse from counter 40, ring counter 21 pulses lead C2, thereby enabling gate G2 and sending the output of slicer S2 over lead CL to shift register SR1. Simultaneously, counter 40 provides a shift pulse to shift registers SR1 through SR15, thereby shifting the information bit contained in the first stage of register SR1 to the next stage. The output of slicer S2 is thus registered in the first stage of register SR1 as the information bit previously obtained from slicer S1 is shifted to the second stage of register SR1. This process continues until all of input channels L1 through L64 have been sampled in this manner and the samples registered serially in successive stages of shift register SR1.

After channel L64 is sampled, channels L1 through L64 are sampled again in sequence in a similar manner by ring counter 21. Since the last stage of register SR1 is connected directly to the first stage of register SR2, the information bits contained in register SR1 are shifted serially into register SR2 while channels L1 through L64 are sampled for a second time and registered in register SR1. Thereafter, as the sampling of channels L1 through L64 continues in subsequent cycles, the information bits contained in registers SR1 and ST2 are shifted serially into successive ones of shift registers SR3 through SR15. After 15 such sampling cycles, each of registers SR1 through SR15 contains information bits relating to input channels L1 through L64.

FIG. 2 depicts a portion of a typical pattern of information bits, representing samples from channels L1 through L64, which may be registered in shift registers SR1 through SR15 at the end of fifteen sampling cycles. Since each of registers SR1 through SR15 has a plurality of storage locations equal in number to the number of input channels, that is, 64, information bits from each of channels L1 through L64 are stored in a corresponding location in each of shift registers SR1 through SR15. For example, as shown in FIG. 2, the first storage location of shift register SR2, and of each of the other shift registers, contains a bit relating to channel L64, the second storage location of each register contains a bit relating to channel L63, such that and so forth, the last storage location of each shift register contains a bit relating to channel L1.

Accordingly, when the nest pulse from counter 40 appears on leads 31 and 42, that is, the first pulse of the sixteenth sampling cycle, channel L1 is sampled and the resulting bit is extended over lead CL to register SR1. This bit also appears on transfer lead LD1. At the same time, the previous 15 bits relating to channel L1, stored in the last storage locations of registers SR1 through SR15, appear on transfer leads LD2 through LD16, respectively. The "oldest" bit from channel L1 thus appears on lead LD16 and the "newest" bit appears on lead LD1.

The information bits on leads LD1 through LD16 are simultaneously registered in parallel in storage locations 1 through 16, respectively, of buffer shift register 22 by a load pulse received over lead 32 from counter 41. Counter 41, it will be recalled, pulses the load terminal of shift register 22 via lead 32 once every seven pulses received from counter 40, and thus once every 35 clock pulses from clock 20. Since the pulses from counter 40 also shift the bits in registers SR1 through SR15, information bits from a different one of channels L1 through L64 are registered in shift register 22 by each successive pulse from counter 41. For example, if for one pulse of counter 41, bits from channel L1 are registered in register 22, on the next pulse, bits from channel L8 are registered therein. Following that, bits from channels L15, L22 L29,...L57 and L64 are successively transferred over leads LD1 through LD16 into register 22. On the next cycle of loadings from leads LD1 through LD16, bits obtained from channels L7, L14, L21,...L56, and L63 are transferred into register 22. In this manner, information bits from channels L1 through L64 are registered in shift register 22.

As soon as information bits relating to a given input channel are registered in shift register 22, they are rapidly shifted out of register 22 serially into lead 34 by shift pulses received via lead 33 from clock 20. Thirty-five shift pulses are received over lead 33 between parallel loadings of register 22 from leads LD1 through LD16. Since register 22 has 16 stages, only 16 of the shift pulses are required to shift the bits contained in register 22 onto lead 34, the remaining period (19 clock pulses in length) until the next loading of register 22, being a period of relaxation for detector 24.

FIG. 3 illustratively shows a typical output from shift register 22 on lead 34. For example, assume that bits relating to channel L1 have just been transferred to register 22 by a load pulse from counter 41 in the manner described. Then serial shift pulses form clock 20 on lead 33 cause the registered bits to be read out on lead 34. The 16 bits in register 22 relating to channel L1 (of which five are shown in FIG. 3) are delivered to lead 34 by the first 16 shift pulses from clock 20 during the interval T1 in FIG. 3. With register 22 emptied, no bits are read during the next 19 serial pulses, which is the "relaxation period" shown as interval T2 in FIG. 3. Responsive to the next pulse from counter 41, bits from channel L8 are registered in shift register 22 and thereafter shifted onto lead 34 during the interval T3. Following another relaxation period, interval T4 in FIG. 3, bits from channel L15 are are loaded into and subsequently shifted out of register 22.

Bits shifted out of shift register 22 onto lead 34, which form an approximation of a signal appearing on one of channels L1 through L64, are amplified by amplifier 23 and provided to frequency detector 24. As a result of the time compression attributable to shifting the bits out of register 22 at a rate considerably greater than the sampling rate for a single one of channels L1 through L64, frequency detector 24 is designed to detect a frequency which is higher than the frequency to be detected on the input channels. Thus, since the combination of five-state counter 40 and ring counter 21 provides sampling of a given input channel once every 320 pulses of clock 20, in the embodiment of FIG. 1, detector 24 is designed to detect a frequency 320 times higher than the predetermined frequency to be detected on channels L1 through L64.

Many variations of the embodiment shown in FIG. 1 can be constructed in accordance with the principles of this invention. For example, if the tone detector is to accommodate a different number of input channels the timing circuitry may be changed and the number of stages in each of serial shift registers SR1 through SR15 may be altered so that the number of stages in each register equals the number of input channels. Also, the number of serial shift registers, the corresponding number of stages in register 22, and the number of states in counter 41 may be changed in such a way that parallel loading into shift register 22 takes place at a different rate. Furthermore, instead of using a reactive frequency detector, as illustratively depicted by detector 24, frequency detection may be performed digitally by directly examining the contents of shift register 22.

One advantage of the tone detector of FIG. 1 is that its accuracy is not dependent upon the frequency of pulses generated by clock 20. As a result, it is not necessary to employ an extremely precise, expensive clock to drive the system.

In the embodiment of FIG. 1 described above, a single frequency is detected on individual ones of a plurality of channels by directing single bit samples from each channel to a common frequency detector 24. However, if a multifrequency signal is to be detected on the channels, a single bit arrangement may not be sufficiently accurate for many applications. Accordingly, multifrequency tone detection using multibit samples may be performed advantageously with the embodiment of FIG. 1 by using analog-to-digital converters in place of slicers S1 through S64, and by using a digital-to-analog converter between the output of shift register 22 and the input to frequency detector 24. It will be apparent that additional shift registers are also required in parallel with each of shift registers SR1 through SR15 and in parallel with shift register 22 to accommodate the extra bits of the multibit binary words generated by the analog-to-digital converters as accurate representations of the signal sample amplitudes.

MULTIFREQUENCY TONE DETECTOR

Figure 4:
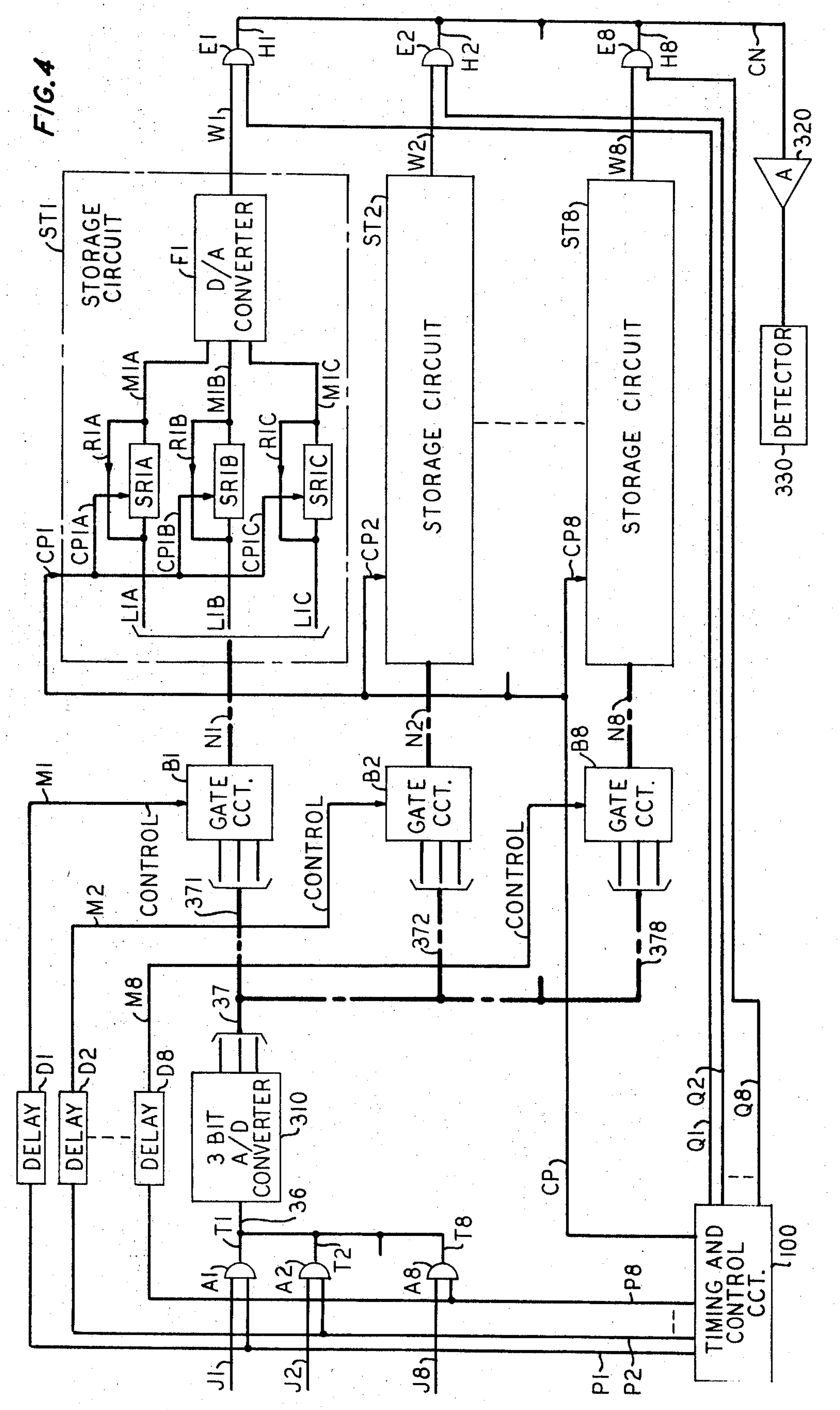
FIG. 4 is a block diagram of an illustrative embodiment of a multifrequency tone detector in accordance with the invention.

An alternative arrangement for detecting a predetermined multifrequency signal on any one of a number of communication channels is shown in FIG. 4. Assume that channels J1 through J8, of which J1, J2, and J8 are shown, are channels to be examined for a predetermined multifrequency signal. Channels J1 through J8 are successively connected, with preservation of signal amplitude, through individual AND gates A1 through A8 to respective leads T1 through T8 by timing pulses over leads P1 through P8, respectively, from timing and control circuit 100. Leads T1 through T8 are multiplied to lead 36, which is connected to the input of 3-bit analog-to-digital converter 310. Converter 310 generates "in parallel on cable 37" a 3-bit binary word output representative of the signal sample amplitude on cable 37. CAble 37 extends in parallel the multibit word output of converter 310 in parallel over each of cables 371 through 378 to the input terminals of gate circuits B1 through B8, respectively. Gate circuits B1 through B8 each comprising known combinations of AND gates or equivalent logic gates, passes the 3-bit words under the control of gating pulses applied to the respective control terminals thereof. The control terminals of gate circuits B1 through B8 are connected to timing and control circuit 100 over leads M1 through M8, through delay circuits D1 through D8, and over leads P1 through P8. The delay provided by delay circuits D1 through D8 may, in practice, be generated advantageously as additional output states of timing and control circuit 100 in a well-known manner.

The outputs of gate circuits B1 through B8 are connected over cables N1 through N8 to respective storage circuits ST1 through ST8. Since storage circuits ST1 through ST8 are assumed to be substantially identical, only circuit ST1 is shown in detail in FIG. 4.

Output cable N1 from gate circuit B1 is connected via leads L/A, L/B and L/C to the input terminals of recirculating 64-bit shift registers SR1A, SR1B, and SR1C, respectively, in storage circuit STI. The output terminals of shift registers SR1A, SR1B, and SR1C are connected over respective leads M1A, M1B, and M1C to digital-to-analog converter F1. Recirculation of information bits stored in shift registers SR1A, SR1B, and SR1C is provided by respective leads R1A, R1B, and R1C, which are connected from the output terminals to the input terminals of the respective shift registers SR1A, SR1B, and SR1C.

Shift pulses for the registers included in storage circuits ST1 through ST8 are provided by timing and control circuit 100 via lead CP and respective leads CP1 through CP8. WIthin storage circuit ST1, for example, shift pulses for shift registers SR1A, SR1B, and SR1C are extended over leads CP and CP1 to leads CP1A, CP1B, and CP1C, respectively.

The output terminal of digital-to-analog converter F1 is connected over lead W1 to one input terminal of AND gate E1. Similarly, the outputs of storage circuits ST2 through ST8 are connected over respective leads W2 through W8 to input terminals of AND gates E2 through E8, respectively. Leads Q1 through Q8 from timing and control circuit 100 are connected to the remaining input terminals of AND gates E1 through E8, respectively. The output terminals of AND gates E1 through E8 are connected over respective leads H1 through H8 to lead CN. Lead CN is connected to the input of amplifier 320, the output of which is connected to frequency detector 330.

Figure 5:
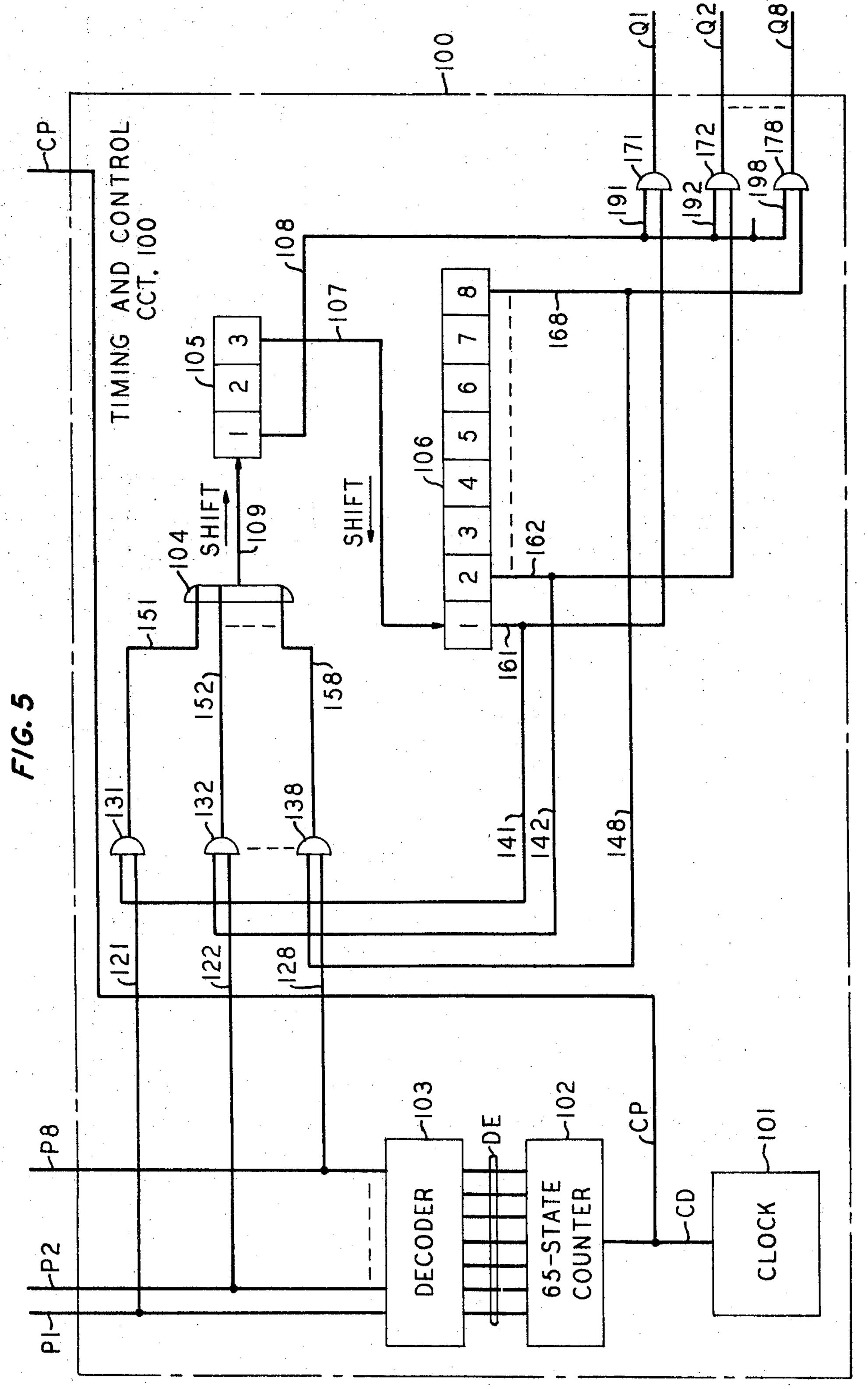
FIG. 5 is a block diagram of a portion of FIG. 4 shown in greater detail.

The principal features of an illustrative arrangement of timing and control circuit 100 are shown in FIG. 5. Clock 101 generates clock pulses on leads CD and CP, lead CD being connected to 65-state counter 102. Counter 102 is connected via leads DE to decoder 103, which generates pulses successively on leads P1 through P8 when 65-state counter 102 is stepped to certain predetermined states (to be described hereinafter) by clock 101.

Figure 6:
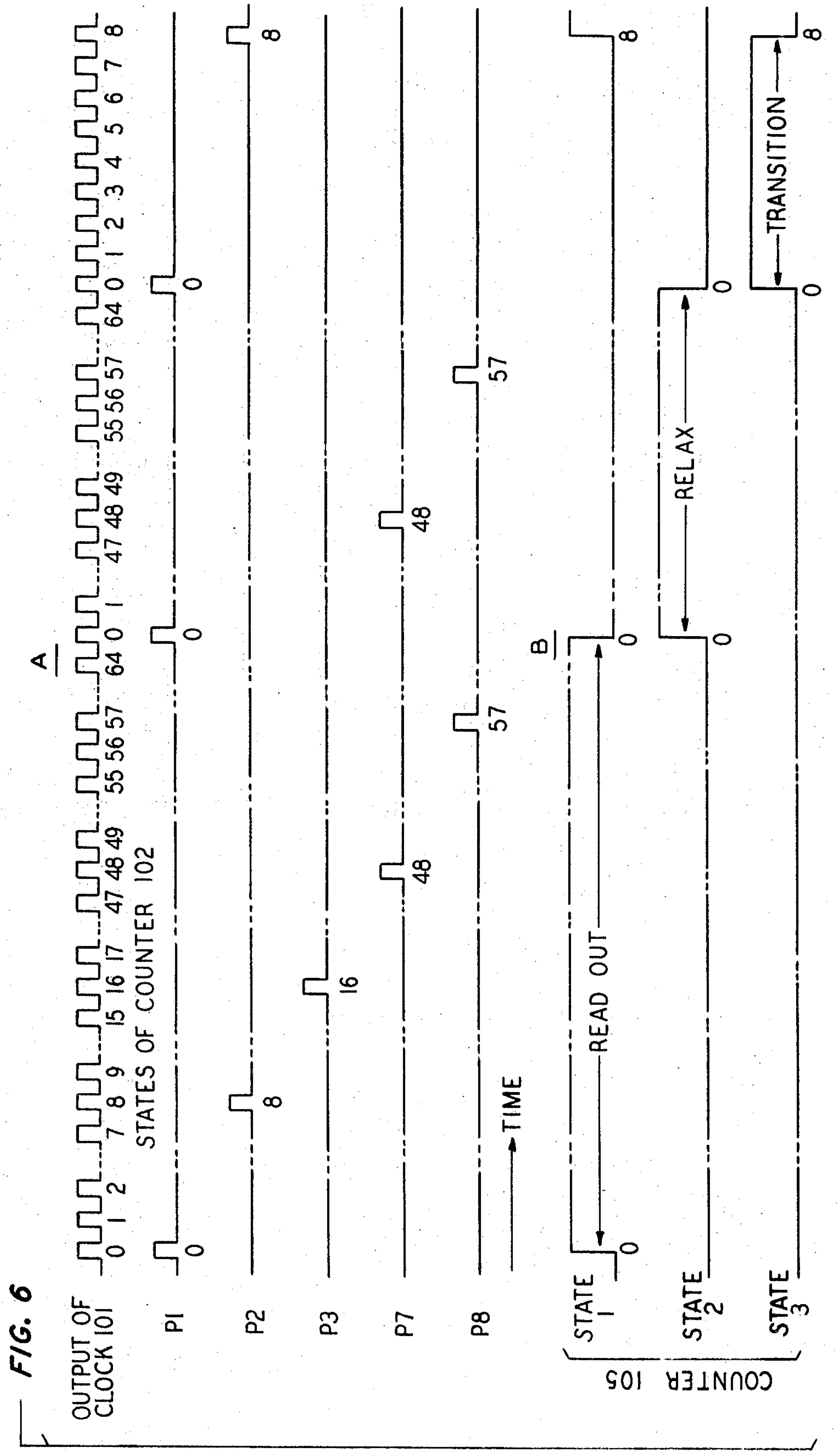
FIG. 6 is a timing diagram useful in describing the operation of the embodiment of FIGS. 4 and 5.

The operation of decoder 103 may be better understood with reference to FIG. 6A, which shows the successive states of counter 102 and the timing of pulses on leads P1, P2, P3, P7 and P8. Counter 102 is stepped through 65 states, designated states 0 through 64 (of which only selected ones are shown in FIG. 6), by pulses on lead CD from clock 101. Decoder 103 generates pulses successively on leads P1 through P7 when counter 102 is in every eighth state, such as states 0, 8, 16,...48, and on lead P8 when counter 102 is in state 57. After lead P8 is pulsed at state 57, lead P1 is pulsed again at state 0, and the process is repeated. Since each of leads P1 through P8 is pulsed once during each cycle of 65 states, the successive pulses on leads P1 through P8 occur at intervals of eight pulses form clock 101, with the exception that nine clock pulses separate the pulses on leads P7 and P8.

Leads P1 through P8 are connected over respective leads 121 through 128 to input terminals of AND gates 131 through 138. The output terminals of AND gates 131 through 138 are connected via respective leads 151 through 158 to OR gate 104. The output terminal of OR gate 104 is connected via lead 109 to the input of 3-state ring counted 105. The state 3 output of counter 105 is connected via lead 107 to the shift terminal of 8-state ring counter 106, so that counter 106 is stepped to the next higher state every time counter 105 reaches state 3. The output of state 1 of counter 105 is connected over lead 108 and leads 191 through 198 to the input terminals of respective AND gates 171 through 178.

The outputs of states 1 through 8 of ring counter 106 are connected via leads 161 through 168, respectively, to inputs of AND gates 171 through 178, the outputs of which are connected to leads Q1 through Q8. Leads 161 through 168 are also connected over leads 141 through 148, respectively, to input terminals of AND gates 131 through 138.

Consider now the operation of the multifrequency detector embodiment in FIGS. 4 and 5 with reference to FIG. 6. Assume that initially all the shift registers in storage circuits ST1 through ST8 are empty. As shown in FIG. 6, when counter 102 is in state 0 a pulse is generated by decoder 103 on lead P1. The pulse on lead P1 enables gate A1, and a sample of the analog signal on channel J1 is passed via leads T1 and 36 to the input of analog-to-digital converter 310. Converter 310 generates a 3-bit binary word representative of the sample value, which is transmitted in parallel over cables 37 and 371 to the input of gate circuit B1. At the same time, the pulse from decoder 103 on lead P1 is also transmitted over lead M1 to gate circuit B1 through delay circuit D1, circuit D1 compensating for the delay inherent in converter 310. Thus the pulse on lead M1 arrives at the control input of gate circuit B1 at the proper time such that the 3-bit binary word on cable 371 is gated through gate circuit B1 to cable N1. The three bits are thus registered in the first stages of 64-bit shift registers SR1A, SR1B, and SR1C.

Successive clock pulses on lead CP from clock 101 in timing and control circuit 100 are extended over lead CP1 and leads CP1A, CP1B, and CP1C to the shift terminals of respective shift registers SR1A, SR1B, and SR1C. Thus, once the 3-bit binary word is registered, as described above, in the first stage of registers SR1A, SR1B, and SR1C, it is immediately shifted by the successive clock pulses through successive stages of these registers and is recirculated via respective leads R1A, R1B, and R1C.

Lead P1 is pulsed again 65 pulses later, when 65-state counter 102 returns to the 0 state, and at this time a second 3-bit word relating to channel J1 is registered in shift registers SR1A, SR1B, and SR1C. Since registers SR1A, SR1B, and SR1C each have 64 storage locations, the three bits previously stored therein are located in the respective second stages of these registers when the next 3-bit word is received on cable via leads L1A, L1B and L1C. As the first and second 3-bit words are shifted and recirculated together, they remain in adjacent storage locations in registers SR1A, SR1B, and SR1C. When counter 102 reaches state 0 for a third time, lead P1 is pulsed again, and a third 3-bit word is registered in registers SR1A, SR1B, and SR1C adjacent the locations of the second 3-bit word. After 64 3-bit words have been thus stored, shift registers SR1A, SR1B, and SR1C are filled with binary words, arranged in chronological order, which are representative of the signal on channel J1. With all the bit locations of registers SR1A, SR1B, and SR1C filled, the next 3-bit word registered supercedes the first 3-bit word. Thereafter, on succeeding 0 states of counter 102, the "oldest" binary word contained in registers SR1A, SR1B, and SR1C is superceded, the result being that the recirculating data contained in the registers is constantly updated and the proper chronological order is maintained.

In addition to being recirculated by leads R1A, R1B, and R1C, the digital data contained in registers SR1A, SR1B, and SR1C is sent via respective leads M1A, M1B, and M1C to the input terminals of digital-to-analog converter F1. Converter F1, therefore, continually generates an analog signal on lead W1 from the recirculating digital data contained in registers SR1A, SR1B, and SR1C.

In the similar manner, shift registers (not shown) in storage circuits ST2 through ST8 are loaded, respectively, with 3-bit binary words representative of the signal on channels J2 through J8. Thus, as shown in FIG. 6A, each time counter 102 reaches state 8, lead P2 is pulsed by decoder 103 to enable gate A2, and converter 310 receives a signal sample and generates a corresponding 3-bit word which is gated through gate circuit B2 into storage circuit ST2. Similarly, a 3-bit word is entered into storage circuits ST3 through ST8 when counter 102 is in states 16, 24, 32, 40, 48, and 57, respectively.

The signals generated by timing and control circuit 100 on leads Q1 through Q8 are utilized in reading the stored data out of storage circuits ST1 through ST8 over lead CN to detector 330. Referring to FIG. 6A, assume that immediately after the first pulse is provided on lead P1, counter 105 is in state 1 and counter 106 is in state 1. Gate 171 accordingly is enabled by respective signals at its inputs from counter 105 via leads 108 and 191 and from counter 106 via lead 161. An output is therefore generated by gate 171 on lead Q1, and gate E1 is enabled. The analog signal generated by digital-to-analog converter F1 on lead W1 is thus read out over lead CN through amplifier 320 to detector 330.

The readout of a signal from storage circuit ST1 continues as long as counter 105 is in state 1, that is, for one cycle of counter 102 as shown in FIG. 6B. With counter 106 in state 1, gates 132 through 138 are disabled, and the pulses generated by decoder 103 on leads P2 through P8 are not gated to OR gate 104. Thus, as shown in FIG. 6B, counter 105 remains in state 1 until the next pulse in generated on lead P1. This is passed through enabled AND gate 131 and OR gate 104, stepping counter 105 to state 2, thereby disabling gate 171. WIth no output form gate 171 on lead Q1, gate E1 is disabled, and readout of the signal from storage circuit ST1 is terminated.

Readout of storage circuit ST1 begins at the same time that a new binary word is registered in shift registers SR1A, SR1B, and SR1C (that is, as described above, when a pulse appears on lead P1) to insure that the contained data is read out in chronological order. Although the data in these registers is in chronological order as stored, it is recirculating, and to insure that it is read out in chronological order, readout must begin when the "oldest" word is in the respective last stages of the registers. The latter situation occurs when a new word is added, superceding a previous "olders" word in the respective first stages of the registers. As the following discussion indicates, readout of each of storage circuits ST2 through ST8 also begins as a new 3-bit word is registered therein.

As shown in FIG. 6B, after termination of readout of storage circuit ST1, counter 105 remains in state 2 until the next pulse is generated on lead P1, this "relaxation period" being provided to allow detector 33 to return to a quiescent condition. When decoder 103 next pulses lead P1, the pulse is passed through gates 131 and 104, and counter 105 is stepped to state 3. The output from state 3 over lead 107 steps counter 106 to state 2, thereby disabling gate 131 via leads 161 and 141 and enabling gate 132 via leads 162 and 142.

With gate 132 enabled, the next pulse on lead P2, corresponding (as shown in FIG. 6A) to state 8 of counter 102, is sent via lead 122, gate 132, and gate 104 to the input of counter 105. Counter 105 is stepped to state 1, its output appearing on lead 108. Accordingly, gate 172 is enabled by respective signals from counter 105 via leads 108 and 192 and from counter 106 via lead 162. Gate 172 provides an output on lead Q2, which enables gate E2 and permits a signal to pass on lead W2 from storage circuit ST2 over lead CN to detector 33.

Readout of storage circuit ST2 continues for one complete cycle of counter 102 until the next pulse from decoder 103, coincident with state 8 thereof, appears on lead P2. This pulse passes through enabled gate 131 and steps counter 105 to state 2. After another "relaxation period," the next pulse on lead P2 steps counter 105 to state 3, the output of which, via lead 107, steps counter 106 to state 3 preparatory to the readout of signals from storage circuit ST3. This process continues, and after counter 106 is stepped through all of its 8 states, readout of all of storage circuits ST1 through ST8 is completed.

Since bits stored in adjacent locations in the storage shift registers represent signal samples taken at intervals of 65 pulses from clock 101, a frequency on channels J1 through J8 appears as a signal having a frequency 65 times higher as read out of storage circuits ST1 through ST8. Accordingly, detector 330 is designed to detect a frequency 65 times higher than the predetermined frequency to be detected on leads J1 through J8.

The tone detector shown in FIG. 4 may be altered to accommodate binary words having more or less than three bits. For example, in a single bit detector, the output of converter 310 would be a single bit and only one shift register would be included in each storage circuit.

Moreover, it is apparent to those skilled in the art that the illustrative embodiments of FIGS. 1 and 4 may be constructed such that the signal samples from each channel are stored in analog rather that digital form. For example, in FIG. 4 converters 310 and F1 through F8 may be omitted, and devices, such as delay lines, for storing analog signals may be substituted for the shift registers in the storage circuits.

It is to be understood that the above-described arrangements are only illustrative of the application of the principles of the present invention. In accordance with the principles of this invention, numerous other arrangements may be devised by those skilled in the art without departing from spirit and scope of the invention.

I claim:

1. Apparatus for detecting the presence of a predetermined signal on any one of a plurality of channels comprising means connected to said channels for periodically generating digital information corresponding to the value of signals appearing on each of said channels, means for storing said digital information, readout means for simultaneously obtaining said digital information relating to signals on a single one of said channels from said storage means, detector means, and means connected to said readout means for providing said digital information relating to signals on a single channel to said detector means at a rate greater than the rate at which said digital information is generated by said generating means.

2. Apparatus in accordance with claim 1 wherein said storage means comprises a plurality of shift registers connected in series, each of said shift registers having a number of storage locations equal to the number of said channels multiplied by *m*, where *m* is an integer.

3. Apparatus in accordance with claim 2 wherein said readout means comprises means connected to the last stages of each of said shift registers.

4. Apparatus in accordance with claim 2 wherein said providing means comprises means connected to a corresponding stage of each of said shift registers.

5. Apparatus in accordance with claim 2 wherein said generating means comprises respective analog-to-digital converters connected to each of said channels, and a plurality of gates respectively connected to said converters for gating the output digital information therefrom in sequence to said shift registers, each of said gates being operated at a frequency *n*.

6. Apparatus in accordance with claim 5 wherein said providing means comprises a buffer shift register having a number of storage locations at least equal to the number of said plurality of shift registers, a corresponding stage of each of said plurality of shift registers being connected in parallel to respective ones of said storage locations of said buffer shift register, loading means for transferring in parallel digital information relating to a single channel from said plurality of shift registers to said buffer shift register, and means for shifting said digital information serially out of said buffer shift register at a rate *k* greater then *n*.

7. Apparatus in accordance with claim 6 wherein said predetermined signal is a combination of particular frequencies, and said detector means comprises a frequency detector connected to the output of said buffer shift register for detecting respective frequencies equal to *k*/*n* times said particular frequencies.

8. Apparatus in accordance with claim 1 wherein said generating means comprises means for sampling said channels at a frequency *n*, and an analog-to-digital converter connected to said sampling means for generating digital information corresponding to the value of the output of said sampling means so that said digital information corresponds to the value at the time of sampling of signals appearing on one of said channels.

9. Apparatus in accordance with claim 8 wherein said storage means comprises a plurality of storage circuits, each of said storage circuits being associated with a respective one of said channels, and means connected to said converter for gating said digital information to the particular one of said storage circuits associated with the channel to which said digital information relates.

10. Apparatus in accordance with claim 9 wherein each of said storage circuits comprises a plurality of shift registers having individual input and output leads, said registers being connected in parallel via said input leads to said gating means, and a plurality of recirculation leads associated respectively with said registers and connected respectively to said input and output leads thereof.

11. Apparatus in accordance with claim 10 wherein said providing means comprises means for sifting said digital information from said shift registers at a rate *k* greater than *n*.

12. Apparatus in accordance with claim 11 wherein said readout means comprises individual digital-to-analog converters respectively included in each of said storage circuits and means connected to said converters for gating signals in sequence out of said storage circuits to said detector means.

13. Apparatus in accordance with claim 11 wherein said readout means comprises circuitry connected to said output leads of said shift registers for gating said digital information in sequence out of said storage circuits and a digital-to-analog converter having an input connected to said gating circuitry and having an output connected to said detector means.

14. Apparatus in accordance with claim 11 wherein said predetermined signal is a combination of particular frequencies and wherein said detector means comprises a frequency detector for detecting respective frequencies equal to *k*/*n* times said particular frequencies.

15. Apparatus for detecting the presence of a predetermined signal on any one of a plurality of channels comprising: means for sampling signals appearing on said channels, means for storing said samples, readout means for simultaneously obtaining samples relating to a single one of said channels from said storage means, detector means, and means connected to said readout means for providing said obtained samples to said detector means at a rate at which said channels were sampled by sampling means.